1,468,027

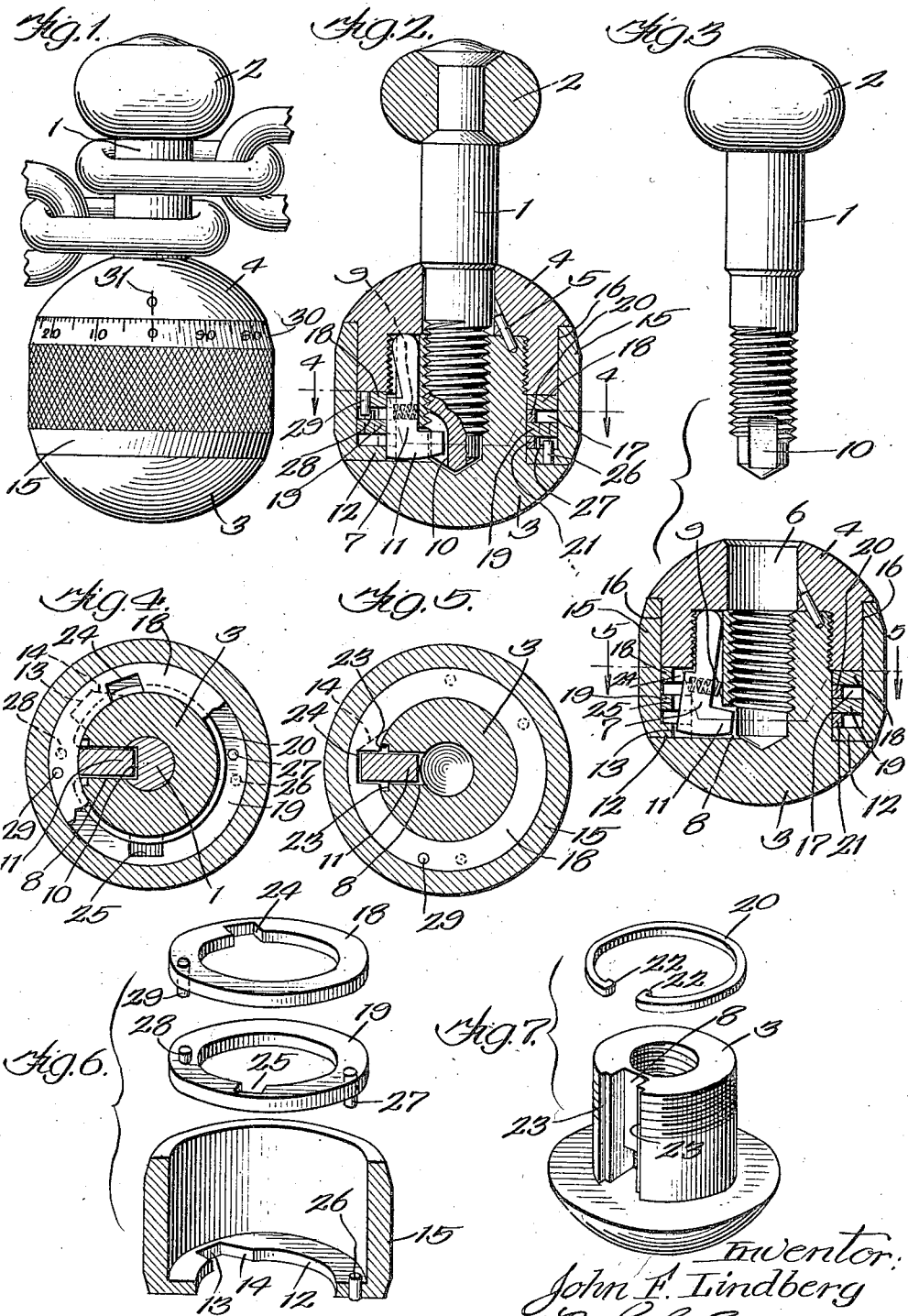
Sept. 18, 1923.
J. F. LINDBERG
LOCKING MECHANISM
Filed Sept. 10, 1921
1,468,027
Inventor:
John F. Lindberg
By G. L. Cragg Atty Patented Sept. 18, 1923.

UNITED STATES PATENT OFFICE.

JOHN F. LINDBERG, OF CHICAGO, ILLINOIS.

LOCKING MECHANISM.

Application filed September 10, 1921. Serial No. 499,652.

*To all whom it may concern:*

Be it known that I, JOHN F. LINDBERG, citizen of the United States, residing at Chicago, in the county of Cook and State of Illinois, have invented a certain new and useful Improvement in Locking Mechanism, of which the following is a full, clear, concise, and exact description.

My invention relates to locking devices and has for its object the employment of a bolt as a component part thereof and which is adapted to be held in locked position at one end or part thereof, the other end being formed with a rotatable head to prevent the application thereat of a forcing tool. A lock thus constructed may, for example, have the bolt thereof passed through the end links of a chain, these links occupying the space between the revoluble head upon the bolt and the locking mechanism which includes the other end of the bolt. The invention, however, is not to be limited to any particular use to which it is to be put, nor is the locking device to be limited to the employment of a revoluble head upon the bolt thereof as there are other characteristics of the invention which I believe to be novel and useful.

The locking mechanism preferably includes a combination lock that employs a plurality of rings surrounding a holding pawl that is provided to prevent the bolt from turning with respect to the locking mechanism applied thereto. These links are formed to have sequential engagement and are provided with recesses into which the pawl may be moved to a releasing position, the recesses registering for this purpose when the engaged rings of the combination lock are in engagement. A spring is preferably employed for thrusting the pawl into releasing position when the recesses in the rings are in register.

I will explain my invention more fully by reference to the accompanying drawing in which Fig. 1 is a view in elevation of the preferred embodiment thereof, the end links of a chain being shown in association with the structure of my invention; Fig. 2 is a view partially in section and partially in elevation of the device; Fig. 3 shows elements of the device in separated relation, the combination lock portion being shown in section; Fig. 4 is a sectional view on line 4—4 of Fig. 2; Fig. 5 is a sectional view on line 5—5 of Fig. 3; Fig. 6 is a perspective view of parts of the combination lock in separated relation, one of these parts being shown in section; and Fig. 7 is a view illustrating other parts of the combination lock in separated relation.

Like parts are indicated by similar characters of reference throughout the different figures.

The lock illustrated includes a bolt 1, preferably solid. This bolt has a head 2 upon its outer end, this head being revoluble with respect to the balance of the bolt to prevent effective application of any forcing tool to the bolt. The inner end of the bolt is threaded and a nut 3 is screwed thereon. Another nut 4 is screwed upon the nut 3 and is held in fixed relation thereto as by means of the pins 5. The shank of the bolt passes through the smooth bore 6 formed in the nut 4, the threaded end of the bolt thereafter being screwed into the threaded bore of the nut 3. The nuts 3 and 4, held in fixed relation as described, are so shaped as to afford spacing upon the exteriors of the nuts in which the bolt holding means and the combination lock structure are contained. The bolt holding means is preferably in the form of a holding pawl 7 operating in a recess 8 formed in the nut 3. A coil spring 9 tends to thrust the pawl outwardly into releasing position in order that the bolt 1 may be freely turned into full threaded engagement with the nut 3 that may be completely separated from engagement with that nut, as desired. When the bolt 1 is in full engagement with the nut 3 it is positioned to have the recess 10 at the inner end and upon one side thereof in register with the recess 8 so that when the holding pawl 7 is depressed into holding position against the force of the spring 9 the nose 11 of the pawl will project into the recess 10 and prevent the bolt from turning with respect to the nut 3. The means for pressing the pawl into holding position desirably resides in a ring 12 which surrounds the shank portion of the nut 3 and is provided with a recess 13 which may be turned into and out of register with the recess 8 and the pawl 7. This recess has a cam surface 14 that is adapted for cam engagement with the outer side of the pawl whereby the pawl may be gradually forced into the recess 10 as the ring 12 is turned. This ring is desirably formed with a skirt or rim portion 15 that is cylindrical and co-axial with the nuts 3 and 4, this cylindrical portion 15 filling the cylindrical space 16 that intervenes between the enlarged outer ends of the nuts 3 and 4. Additional cylindrical or annular spacing 17 intervenes between the inner face of the nut 4 and the lower or head portion of the nut 3. A plurality of combination locking rings 18 and 19 are disposed in this spacing, as is also the ring 12. Spacing rings 20 and 21 keep the rings apart. These spacing rings are inturned as indicated at 22 in Fig. 7, the inturned ends of the rings being received in lateral enlargements 23 of the recess 8 in the nut 3 whereby the space between the ends of the spacing rings is maintained in register with the recess 8 to permit the pawl 7 to swing between the ends of the spacing rings.

The rings 18 and 19 are formed with recesses 24 and 25 which are adapted for alignment with the recess 13, there being no cam portions at the recesses 24 and 25, however, that correspond to the cam portion 14 at the recess 13.

When the recesses 13, 24 and 25 are in alignment and are all in register with the recess 8, the spring 9 is free to function to thrust the pawl 7 outwardly into releasing position to permit the bolt 1 to be freely turned. When the recess in any ring of the combination lock is out of register with the recess 8 in the nut 3 the pawl 7 will be held in its bolt engaging position. In order that these rings may be constituted a portion of the combination lock they are adapted for sequential engagement. To this end the ring 12 has an engaging pin 26 adapted to engage the pin 27 in the ring 19 and this latter ring 19 has a pin 28 adapted to engage a pin 29 in the ring 18. These pins are variously located in different locks according to the combinations which are employed to open and close the locks.

The master ring is the ring 12, the rim or skirt 15 thereof being formed with a scale 30 having equally spaced apart marks thereon, some of which are numbered. The enlarged portion or head of the nut 4 has an index mark 31 thereon to guide the manipulator in the adjustment of the locking rings. When the bolt 1 has been screwed into the nut 3 and is positioned to have its recess 10 in register with the recess 8, the ring 12 may be turned to depress the pawl 7 into the recess 10 in a manner which has been described. The ring 12 is desirably turned back and forth to have the recesses in the other rings 18 and 19 brought out of register with the recess 8 so that all of the locking rings will co-operate in holding the pawl in its depressed position, adjustment of all of the locking rings being required to release them from holding engagement with the pawl. To this latter end the ring 12 is turned back and forth until it and the other locking rings 18 and 19 are positioned with their recesses in register with the recess 8.

As illustrated, the assembled nuts 3 and 4 and the ring 12 with its skirted portion 15 together form a structure that is somewhat globular and sufficiently heavy to prevent the passage thereof through the overlapping links of a chain or other parts that are to be locked and through which the bolt itself may be passed. The revoluble head 2 is also sufficiently large to prevent it from being passed through the chain links, this head being revoluble, as stated, in order that no forcing tool may be applied to the bolt to break the engagement of the bolt with the pawl 7.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

The combination with a bolt; of a nut in threaded engagement with the bolt; a holding pawl for preventing the nut from turning upon the bolt; and a combination lock for holding the holding pawl in functioning position and including a plurality of rings surrounding the pawl, bolt and nut and formed to have sequential engagement and having recesses into which said pawl may be moved to releasing position, said recesses registering for this purpose when the engageable rings are in engagement.

In witness whereof, I hereunto subscribe my name this 31st day of August A. D., 1921.

JOHN F. LINDBERG.